US007832875B2

(12) United States Patent
Matic-Vujovic et al.

(10) Patent No.: US 7,832,875 B2
(45) Date of Patent: Nov. 16, 2010

(54) MODULATED DIODE PUMPED MICROCHIP LASER PROJECTOR

(75) Inventors: Marina Matic-Vujovic, Kitchener (CA); Kurt D. Rueb, Kitchener (CA); Cristian I. Balasa, Waterloo (CA); Ernesto Zamora, Kitchener (CA)

(73) Assignee: Virtek Vision International Inc., Waterloo (CA)

( * ) Notice: Subject to any disclaimer, the term of this patent is extended or adjusted under 35 U.S.C. 154(b) by 751 days.

(21) Appl. No.: 11/536,454

(22) Filed: Sep. 28, 2006

(65) Prior Publication Data

US 2007/0070297 A1  Mar. 29, 2007

Related U.S. Application Data

(60) Provisional application No. 60/721,820, filed on Sep. 29, 2005.

(51) Int. Cl.
*G03B 21/20* (2006.01)

(52) U.S. Cl. .............................. 353/85; 353/30; 353/37; 353/48; 353/50; 353/86; 372/38.01; 372/38.02; 372/38.04; 372/38.06; 372/38.07; 359/196.1; 359/197.1; 359/199.1; 359/199.4; 385/12; 385/24

(58) Field of Classification Search ................. 353/121, 353/30, 37, 48, 50, 51, 85, 86, 87, 98, 99; 372/38.1, 38.01, 38.02, 38.04, 38.06, 38.07, 372/69, 70, 72, 75, 81, 87; 359/196.1, 197.1, 359/199.1, 199.4; 385/12, 24
See application file for complete search history.

(56) References Cited

U.S. PATENT DOCUMENTS

| 4,801,791 | A  | * | 1/1989  | Cain ........................ 250/201.1 |
| 5,422,900 | A  | * | 6/1995  | Reele et al. ............... 372/29.01 |
| 6,483,556 | B1 | * | 11/2002 | Karakawa et al. ........... 348/750 |
| 2005/0041000 | A1 | * | 2/2005  | Plut ............................ 345/39 |
| 2005/0237423 | A1 | * | 10/2005 | Nilson et al. ................. 348/370 |
| 2006/0176682 | A1 | * | 8/2006  | Wu et al. ..................... 362/119 |

* cited by examiner

*Primary Examiner*—Georgia Y Epps
*Assistant Examiner*—Sultan Chowdhury
(74) *Attorney, Agent, or Firm*—Crowell & Moring LLP

(57) ABSTRACT

A laser projector including a green diode pumped microchip laser module projecting a green laser beam, an optical sensor receiving the laser beam, a power control circuit for the green diode pumped microchip laser module receiving a signal from the optical sensor relative to the power output of the laser beam, and control electronics receiving the signal from the optical sensor connected to the power control circuit modulating the power output of the green diode pumped microchip laser module to maintain a substantially constant power output from the green diode pumped microchip laser module.

30 Claims, 6 Drawing Sheets

MODULATED DIODE PUMPED MICROCHIP LASER PROJECTOR

CROSS REFERENCE TO RELATED APPLICATION

The instant application claims priority to U.S. Provisional Patent Application Ser. No. 60/671,820, filed Sep. 29, 2005, the entire specification of which is expressly incorporated herein by reference.

FIELD OF THE INVENTION

The present invention relates generally to laser projection systems, and more particularly to modulated diode pumped microchip laser projector systems.

BACKGROUND OF THE INVENTION

Laser projector systems have been used to assist in various construction techniques, such as the assembly of trusses for building purposes, as well as use in the aircraft manufacturing industry for more precise assembly of certain aircraft components, especially those where extremely narrow tolerances are required.

DPSS is an abbreviation for diode pumped solid state and is used for the technology of producing laser light from solid crystalline material as the lasing medium that is optically pumped from laser diode. Laser diodes produce infrared light of a specific wavelength and it is aligned into the pumped crystal that is capable of lasing a higher wavelength light into a "doubler" crystal that then doubles the frequency and generates visible light of a desired wavelength. Neodymium-doped yttrium aluminum garnet ("Nd:YAG") and neodymium-doped yttrium orthovanadate ("Nd:YVO$_4$") are the most popular pumped crystals for low to medium power 1,064 nm and frequency doubled 532 nm (green) diode pumped solid state lasers. Newer technology bonded the two crystals together in an efficient way and eliminated optical alignment and some other disadvantages of the original technology.

The DPM (Diode-Pumped Microchip) laser crystal is a combination of a pumped crystal (denoted as S1) and a frequency doubler (denoted as S2) (e.g., non-linear optical ("NLO") crystals like potassium titanyl phosphate ("KTP") bonded together in a chip or microchip, as shown in FIG. 1. For example, the two crystals are polished and bonded together, coated and diced so it is possible to produce a couple of hundred of laser chip crystals from one wafer. Optical alignment is simplified because there is no need for a cavity alignment. These are manufactured in a mass production. Laser modules based on the DPM chip are relatively cost efficient, small in size and make them a perfect candidate for a multi head collimator in a laser projection application.

There are different color DPSS lasers available based on this technology using various crystals. Some of the most popular systems used in the marketplace today are the so-called "green" laser systems, which are referred to by this name due to the color of light emitted therefrom. There are, however, several problems associated with conventional diode pumped solid state lasers, including but not limited to lack of efficiency and low to medium inconsistent power levels.

Furthermore, conventional diode pumped solid state lasers typically require a requisite energy build-up for the crystal. That is, there is typically a relatively high blast of energy directed towards the crystal upon start-up, e.g., full power for about 3 milliseconds or more. These particular problems also manifest themselves in various ways, including inconsistent or unacceptable laser pattern projection, especially during the initial start-up phase of the laser projector system.

Additionally, problems regarding the servicing or replacing the one or more of the laser projector modules is also a concern. Typically, the entire laser projector system, including all of the individual laser projector modules, must be powered down before any one laser projector module can be serviced or replaced. Additionally, convention laser projector systems may need to be at least partially dismantled to access and/or remove any particular laser projector module, which can be a time-consuming and complex operation. These delays cause significant manufacturing delays and add to overall manufacturing costs. Additionally, the laser projector modules of conventional diode pumped solid state lasers can cost approximately $1200-2000, thus making them relatively expensive to replace should they become damaged or otherwise inoperable.

Thus, it would be desirable to have a new and improved laser projector system which overcomes at least one of the aforementioned problems.

SUMMARY OF THE INVENTION

In accordance with the general teachings of the present invention, new and improved modulated diode pumped microchip laser projector systems are provided.

More specifically, the laser projector system of the present invention includes a green diode pumped microchip laser module projecting a green laser beam, an optical sensor receiving the laser beam, a power control circuit for the green diode pumped microchip laser module receiving a signal from the optical sensor relative to the power output of the laser beam, and control electronics receiving the signal from the optical sensor connected to the power control circuit modulating the power output of the green diode pumped microchip laser module to maintain a substantially constant power output from the green diode pumped microchip laser module.

In accordance with a first embodiment of the present invention, a laser projector system is provided, comprising: (1) a green diode pumped microchip laser module projecting a green laser beam; (2) an optical sensor receiving the laser beam; (3) a power control circuit for the green diode pumped microchip laser module receiving a signal from the optical sensor relative to the power output of the laser beam; and (4) control electronics receiving the signal from the optical sensor connected to the power control circuit, wherein the laser module is quickly replaceable from the laser projector system without requiring alignment or adjustment of the laser projector system.

In accordance with one aspect of this embodiment, a beam sampling system is provided, the beam sampling system comprising a beam splitter member and a beam compensator member positioned relative to the first beam splitter member.

In accordance with another aspect of this embodiment, the beam splitter system is selectively adjusted to substantially compensate for relative reflectance of the laser beam.

In accordance with still another aspect of this embodiment, the control electronics are selectively operable to modulate the power output of the green diode pumped microchip laser module.

In accordance with yet another aspect of this embodiment, the modulation of the power output of the green diode pumped microchip laser module is selectively operable to maintain a substantially constant power output from the green diode pumped microchip laser module.

In accordance with still yet another aspect of this embodiment, the laser projector includes a galvanometer having a driver rotating a mirror.

In accordance with a further aspect of this embodiment, the control electronics modulates the green diode pumped microchip laser module in proportion to the rotational speed of the mirror.

In accordance with an additional aspect of this embodiment, the green diode pumped microchip laser module includes a laser diode aligned with a pumped crystal bonded to a doubler crystal generating a green laser beam.

In accordance with a still additional aspect of this embodiment, the laser module includes a connection system, wherein the connection system is a quick connect system that electrically connects the system as a byproduct of inserting the laser module.

In accordance with a further additional aspect of this embodiment, the laser module includes a housing and a laser system operable to project the laser beam, wherein the laser system is disposed in a bore formed in the housing, wherein a curable adhesive material is disposed between a surface of the bore and the laser system so as to secure the laser system in a predetermined orientation.

In accordance with a yet additional aspect of this embodiment, a magnet system is provided that is operable to selectively hold the laser module against a surface regardless of orientation.

In accordance with a still yet additional aspect of this embodiment, an enclosure is provided for enclosing the laser module, wherein the enclosure includes a hatch member for permitting access to the laser module.

In accordance with a first alternative embodiment of the present invention, a laser projector system is provided, comprising: (1) a green diode pumped microchip laser module projecting a green laser beam; (2) a beam sampling system, the beam sampling system comprising a beam splitter member and a beam compensator member positioned relative to the beam splitter member, wherein the beam splitter system is selectively adjusted to substantially compensate for relative reflectance of the laser beam; (3) an optical sensor receiving the laser beam; (4) a power control circuit for the green diode pumped microchip laser module receiving a signal from the optical sensor relative to the power output of the laser beam; and (5) control electronics receiving the signal from the optical sensor connected to the power control circuit, wherein the laser module is quickly replaceable from the laser projector system without requiring alignment or adjustment of the laser projector system.

In accordance with an aspect of this embodiment, the control electronics are selectively operable to modulate the power output of the green diode pumped microchip laser module.

In accordance with another aspect of this embodiment, the modulation of the power output of the green diode pumped microchip laser module is selectively operable to maintain a substantially constant power output from the green diode pumped microchip laser module.

In accordance with still another aspect of this embodiment, the laser projector includes a galvanometer having a driver rotating a mirror.

In accordance with yet another aspect of this embodiment, the control electronics modulates the green diode pumped microchip laser module in proportion to the rotational speed of the mirror.

In accordance with still yet another aspect of this embodiment, the green diode pumped microchip laser module includes a laser diode aligned with a pumped crystal bonded to a doubler crystal generating a green laser beam.

In accordance with a further aspect of this embodiment, the laser module includes a connection system, wherein the connection system is a quick connect system that electrically connects the system as a byproduct of inserting the laser module.

In accordance with an additional aspect of this embodiment, the laser module includes a housing and a laser system operable to project the laser beam, wherein the laser system is disposed in a bore formed in the housing, wherein a curable adhesive material is disposed between a surface of the bore and the laser system so as to secure the laser system in a predetermined orientation.

In accordance with a still additional aspect of this embodiment, a magnet system is provided that is operable to selectively hold the laser module against a surface regardless of orientation.

In accordance with a yet additional aspect of this embodiment, an enclosure is provided for enclosing the laser module, wherein the enclosure includes a hatch member for permitting access to the laser module.

In accordance with a second alternative embodiment of the present invention, a laser projector system is provided, comprising: (1) a green diode pumped microchip laser module projecting a green laser beam; (2) a beam sampling system, the beam sampling system comprising a beam splitter member and a beam compensator member positioned relative to the beam splitter member, wherein the beam splitter system is selectively adjusted to compensate for relative reflectance of the laser beam; (3) an optical sensor receiving the laser beam; (4) a power control circuit for the green diode pumped microchip laser module receiving a signal from the optical sensor relative to the power output of the laser beam; and (5) control electronics receiving the signal from the optical sensor connected to the power control circuit, wherein the laser module is quickly replaceable from the laser projector system without requiring alignment or adjustment of the laser projector system, wherein the control electronics are selectively operable to modulate the power output of the green diode pumped microchip laser module, wherein the modulation of the power output of the green diode pumped microchip laser module is selectively operable to maintain a substantially constant power output from the green diode pumped microchip laser module.

In accordance with an aspect of this embodiment, the laser projector includes a galvanometer having a driver rotating a mirror.

In accordance with another aspect of this embodiment, the control electronics modulates the green diode pumped microchip laser module in proportion to the rotational speed of the mirror.

In accordance with still another aspect of this embodiment, the green diode pumped microchip laser module includes a laser diode aligned with a pumped crystal bonded to a doubler crystal generating a green laser beam.

In accordance with a yet another aspect of this embodiment, the laser module includes a connection system, wherein the connection system is a quick connect system that electrically connects the system as a byproduct of inserting the laser module.

In accordance with still yet another aspect of this embodiment, the laser module includes a housing and a laser system operable to project the laser beam, wherein the laser system is disposed in a bore formed in the housing, wherein a curable adhesive material is disposed between a surface of the bore and the laser system so as to secure the laser system in a predetermined orientation.

In accordance with a further aspect of this embodiment, a magnet system is provided that is operable to selectively hold the laser module against a surface regardless of orientation.

In accordance with an additional aspect of this embodiment, an enclosure is provided for enclosing the laser module, wherein the enclosure includes a hatch member for permitting access to the laser module.

Further areas of applicability of the present invention will become apparent from the detailed description provided hereinafter. It should be understood that the detailed description and specific examples, while indicating the preferred embodiment of the invention, are intended for purposed of illustration only and are not intended to limit the scope of the invention.

BRIEF DESCRIPTION OF THE DRAWINGS

The present invention will become more fully understood from the detailed description and the accompanying drawings, wherein:

FIG. 6a illustrates a partial rear perspective view of the replaceable laser module depicted in FIG. 6, in accordance with a fourth aspect of the present invention;

The same reference numerals refer to the same parts throughout the various Figures.

DETAILED DESCRIPTION OF THE INVENTION

The following description of the preferred embodiment(s) is merely exemplary in nature and is in no way intended to limit the invention, or uses.

Figure 1:
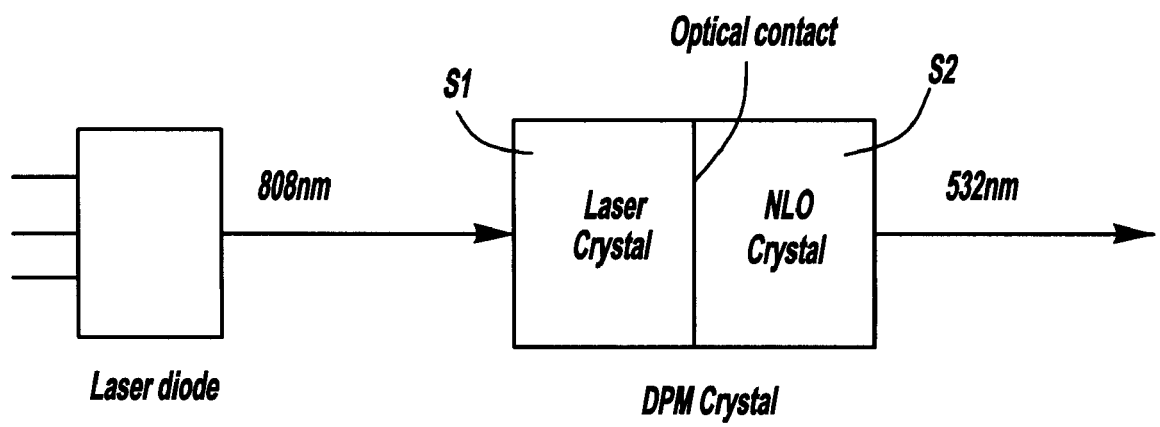
FIG. 1 illustrates a schematic view of a DPM (Diode-Pumped Microchip) laser crystal comprising a combination of a pumped crystal and a frequency doubler (e.g., a non-linear optical ("NLO") crystal like potassium titanyl phosphate ("KTP")) bonded together in a chip or microchip, in accordance with the prior art.
Figure 2:
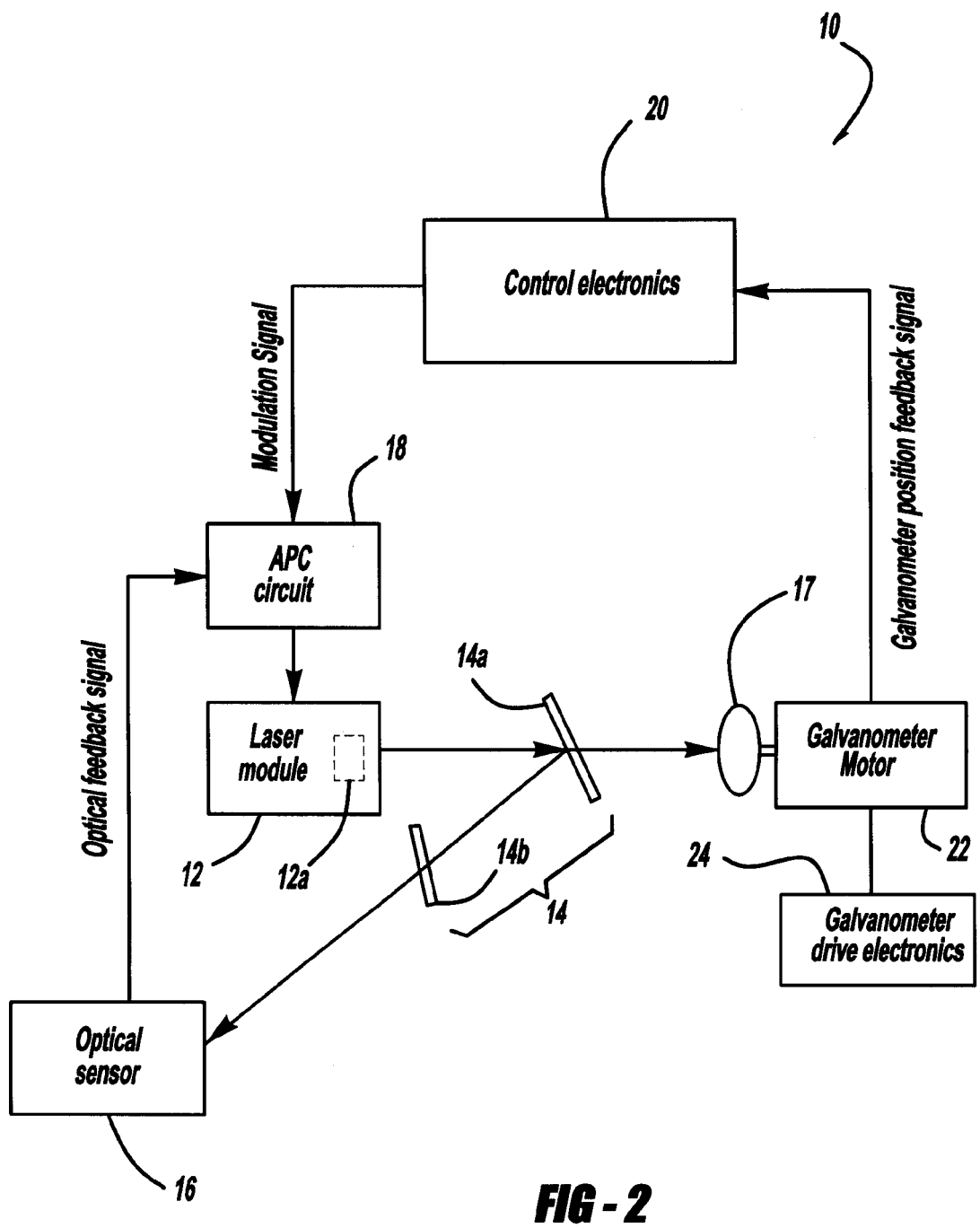
FIG. 2 illustrates a schematic view of a laser projection system employing a modulated diode pumped microchip system, in accordance with the general teachings of the present invention.

Referring to FIG. 2, there is generally shown a laser projector system 10 that includes a laser projector module 12 including a pumped infrared laser diode, DPM chip or microchip 12a (e.g., as shown in FIG. 1), with or without optics for resizing or collimating the beam. Infrared light is filtered from the outgoing beam, so that only the visible light is passing through to the outside of the module 12.

The output beam is aligned, via a beam splitter system 14 (or through a beam combiner, a flap, a turning mirror, or directly) onto an external sensor 16 (e.g., an optical sensor) that provides a feedback (e.g., optical) signal proportional to the power of visible laser light generated by the DPM crystal based module to either or both of the automatic power control circuit ("APC") 18 and/or control electronics 20.

Figure 3:
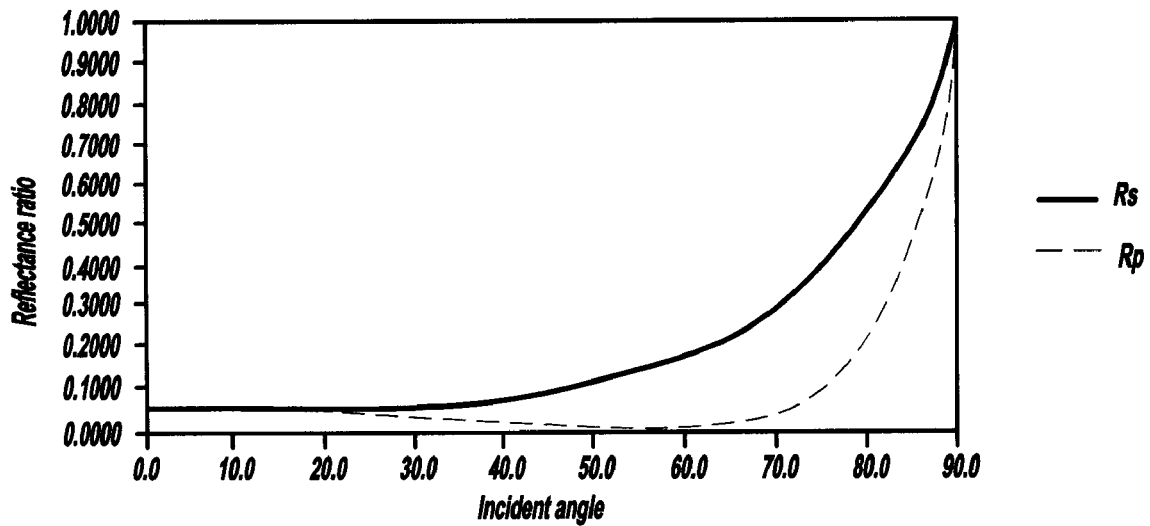
FIG. 3 illustrates a graphical view of reflectance versus incidence angle of the system of the present invention expressed as reflection ratio versus incident angle for both the $R_s$ and $R_p$ components, in accordance with a first aspect of the present invention.
Figure 4:
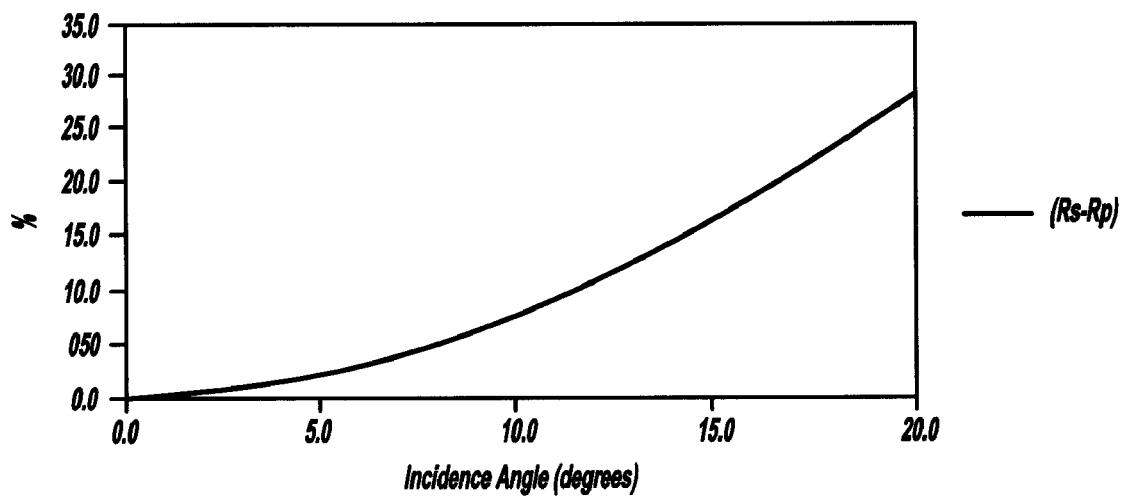
FIG. 4 illustrates a graphical view of the $R_s$-$R_p$ percentage of the system of the present invention expressed as percentage versus incidence angle, in accordance with a second aspect of the present invention.

The beam splitter system 14 includes a beam splitter 14a and a beam compensator 14b oriented relative to beam splitter 14a to substantially compensate for polarization variations. It should be appreciated, however, that the relative positions between the beam splitter 14a and the beam compensator 14b can be varied through alternate configurations to provide the required compensation. In accordance with a preferred embodiment of the present invention, the beam splitter 14a is oriented at an incidence angle of 15° to the beam and the beam compensator 14b is oriented at an incidence angle of approximately 50° to the sampled beam. Without being bound to a particular theory of the operation of the present invention, the beam splitter system 14 (e.g., including the beam splitter 14a and the beam compensator 14b) is intended to aid in the accurate control of the laser beam output without the need for polarization of the laser beam. That is, although the $R_s$ and $R_p$ components differ somewhat, the beam splitter 14a and the beam compensator 14b function to essentially cancel out the resulting variations in reflectance, e.g., due to polarization variations in the source beam. Accordingly, power output of the laser projector system 10 of the present invention can be substantially controlled, e.g., as shown in FIGS. 3 and 4, such that precisely controlled laser beam output power can be achieved.

Additionally, a portion of the output beam is directed by the beam splitter system 14 onto a mirror 17 operably associated with a galvanometer motor 22. With establishing the optical feedback loop, the laser is operated in an automatic power control circuit ("APC") 18. The APC circuit 18 maintains constant light power output from the laser proportional to the control signal, compensating for temperature, polarization and other changes. Without being bound to a particular theory of the operation of the present invention, it is believed that it does that by pumping the needed amount of current through the laser and can do so up to a current limit set point adjustable in the circuit.

Control electronics 20 modulates laser light power in a desired way, which in a preferred embodiment is matched to the speed of the galvanometer motor 22, operably associated with the galvanometer drive electronics 24, used in a laser projector for spreading the beam around. A galvanometer position feedback signal is generated by the galvanometer drive electronics 24 and is communicated to the control electronics 20.

Laser projection is a visible application and it is important to have a uniformly intense beam across the whole projected pattern. The feedback loop and APC circuit 18 of the laser diode driver board provide linear response of the laser output power to a modulation signal coming from the control electronics 20.

Thus, in a preferred embodiment of the laser projector of the present invention, the laser projector includes a green diode pumped microchip laser module, preferably including a laser diode aligned with a pumped crystal bonded to a doubler crystal as described above with reference to FIG. 1, generating a green laser beam, an optical sensor receiving the laser beam, a power control circuit for the green diode pumped microchip laser module receiving the signal from the optical sensor relative to the power output of the laser beam, and control electronics receiving the signal from the optical sensor connected to the power control circuit modulating or controlling the laser module to maintain a substantially constant power output of the green diode pumped microchip laser module.

Figure 5:
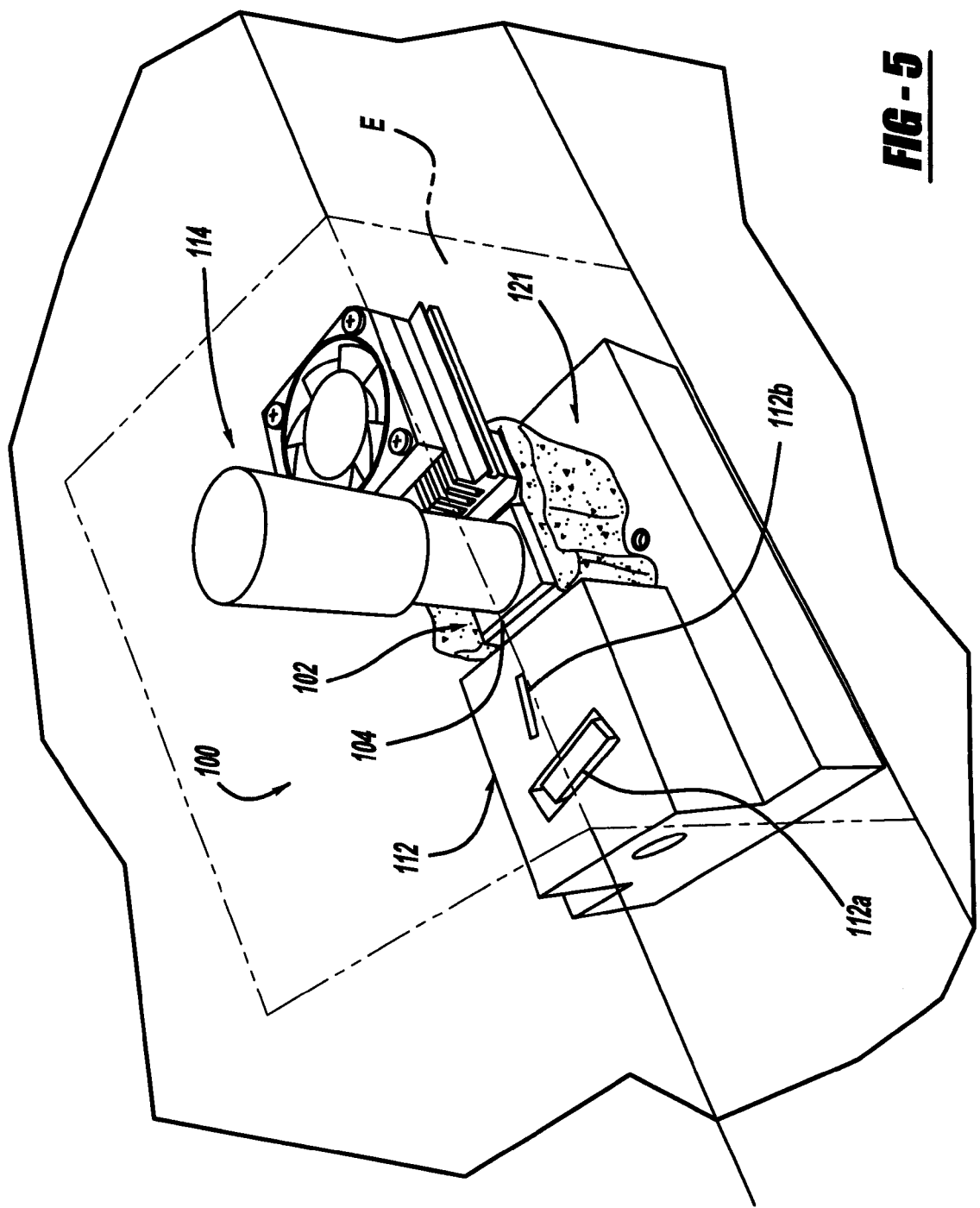
FIG. 5 illustrates a partial perspective view of a replaceable laser module installed onto a laser projector system with an installation tool, in accordance with a third aspect of the present invention.
Figure 6:
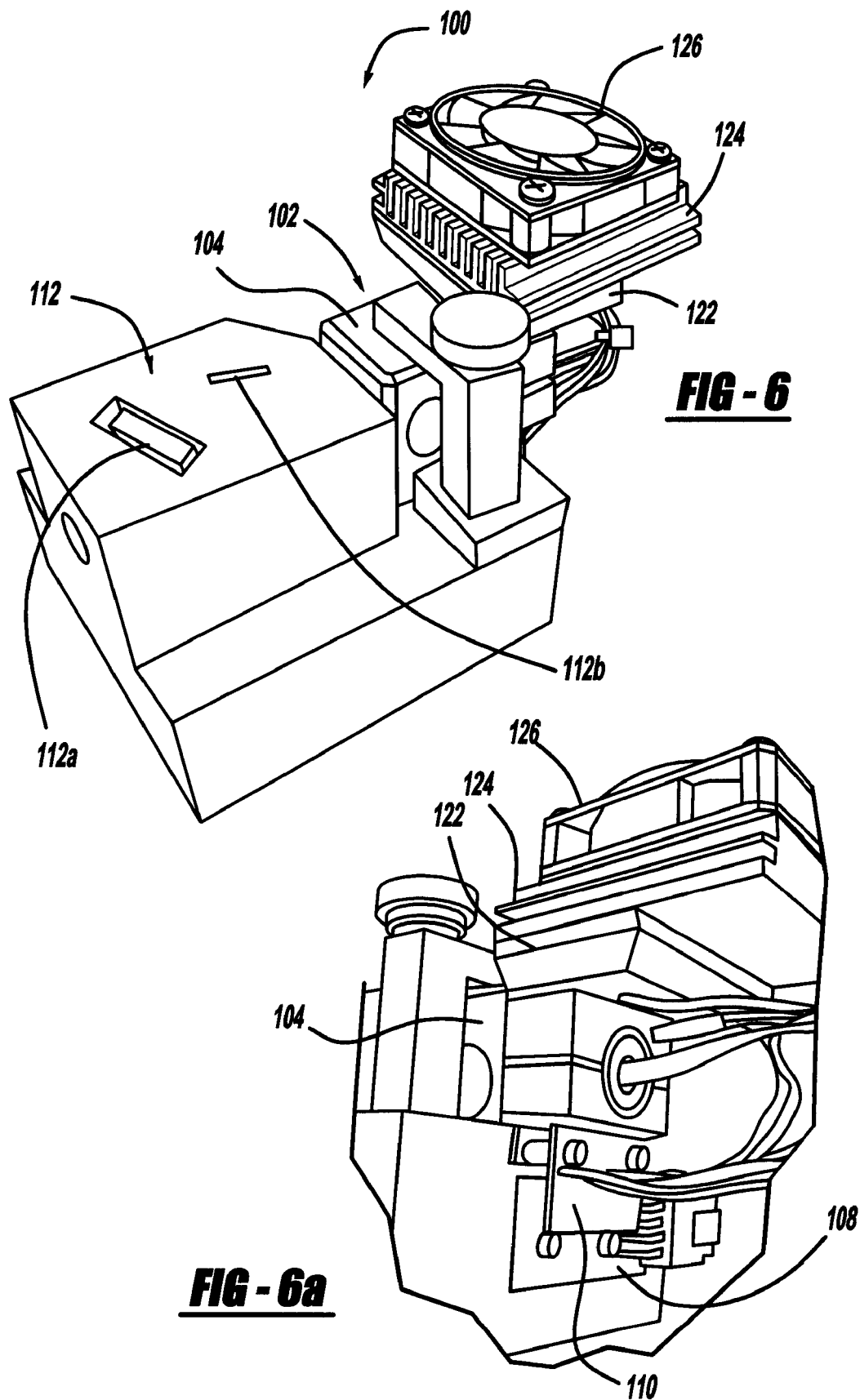
FIG. 6 illustrates a partial perspective view of a replaceable laser module for a laser projector system installed onto the laser projector system, in accordance with a fourth aspect of the present invention.
Figure 7:
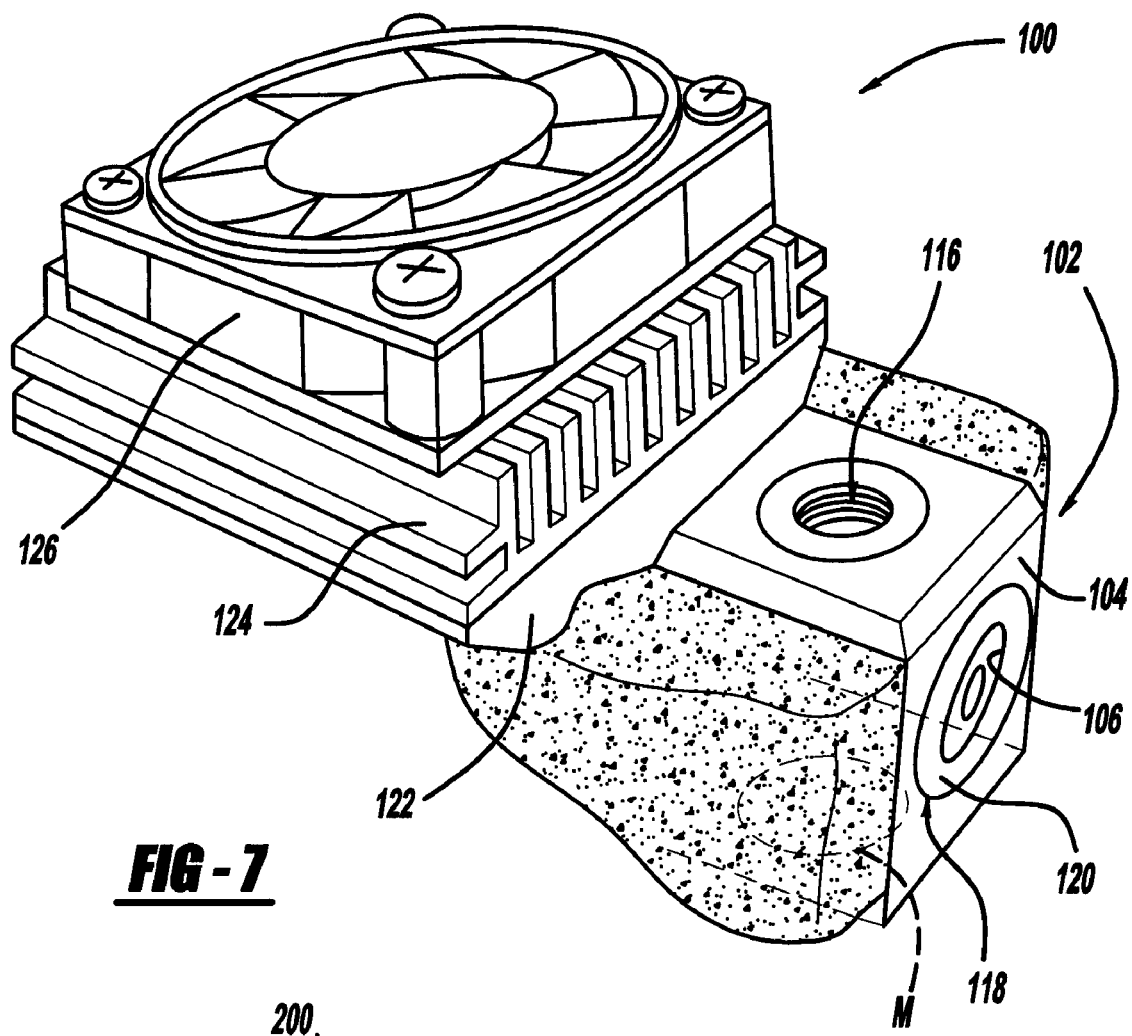
FIG. 7 illustrates a partial perspective view of a replaceable laser module, in accordance with a fifth aspect of the present invention.

As previously noted, conventional laser modules are periodically replaced by first powering down or disconnecting the power supply, then reaching inside of the projector through an opening provided for service, disconnecting the connector to the laser module, quick releasing and taking out of the old module, dropping the new one in place, securing it and connecting the connector to the board. The laser projector may then be powered up. As used herein, the term "laser module" includes the laser source or laser head and typically includes a tuned driver board which drives the laser head, including a power control. However, the term laser module as used herein may be limited to the laser head with appropriate connectors. As will be understood by those skilled in this art, this method requires interruption of the use of the laser projector, powering down the projector, waiting an appropriate time and then removing and replacing and aligning the laser module as described. Then, the laser projector may be reconnected to the power source To overcome this problem, the present invention provides a method and apparatus for quickly and easily replacing a laser module in a laser projector system, such as but not limited to those described above, without having to power the laser projector down or align optically, e.g., as shown in FIGS. 5-7.

In this embodiment, a laser projector system 100, laser module 102, laser module housing 104, laser system 106, laser module connection member 108, laser projector system connection member (e.g., a laser driver board) 110, and a beam splitter system 112 (e.g., including a beam splitter 112a and a beam compensator 112b) are shown. An optional installation tool 114 is also shown, e.g., for installing and/or removing the laser module 102 onto and/or from the laser projector system 100. The installation tool 114 can be equipped with a threaded end portion (not shown) that screws into and out of a threaded bore 116 formed on a surface of the laser module housing 104. In this manner, the laser module 102 can be installed and/or removed without the need for an operator to touch, and possibly damage, the laser module 102 during the respective process.

Additionally, an enclosure E can be provided around the laser module 102, such that a selectively movable hatch can be manipulated so as to provide access to the laser module 102.

The laser system 106 can be secured in a bore 118 formed on another surface of the laser module housing 104, e.g., with a jig (not shown) or other device. An adhesive 120 or other suitable material can then be introduced into the space between the laser system 106 and the surface of the bore 118 and allowed to dry or cure so as to harden, thus holding the laser system 106 securely in place in the correction orientation relative to the laser module housing 104. Additionally, an optional insulation material 121 (e.g., foam or other suitable material) can be placed or enveloped around the laser module housing 104 to prevent the ingress of water and/or other contaminants which could damage the laser system 106. Furthermore, a magnet system M, e.g., including one or more magnet members, can be provided on a surface that the laser module housing 104 is intended to abut against. In this manner, the laser module housing 104, provided that it is comprised of a material that can be acted upon by a magnet, will releasably adhere to the magnet system M while being positioned, without falling down or off of the abutting surface. This is particularly advantageous if the laser module housing 104 is being mounted upside down, on a ceiling, or other unusual orientation.

In order to simplify the various connections (e.g., electrical, control, ground, and/or the like) between the laser projector system 100 and the laser module 102, the laser module connection member 108 and the laser projector system connection member 110 are adapted to easily mate with one another so as to enable quick connect/disconnect engagements. That is, the installation tool 114 can easily manipulate the laser module 102 in a first direction such that the laser module connection member 108 is precisely aligned with the laser projector system connection member 110 and easily and precisely clicks into the laser projector system connection member 110 so as to form a secure connection therebetween. For removal purposes, the previously described process is reversed, wherein the installation tool 114 is rotated in a second direction (opposite from the first direction) such that the laser module connection member 108 lifts away from the laser projector system connection member 110, thus disengaging the laser module connection member 108 from the laser projector system connection member 110. In this manner, replacement laser modules can be quickly and easily removed and replaced without having to power down the entire laser projector system.

Furthermore, additional optional components, such as but not limited to mounting blocks 122, heat sinks 124, fans 126, and/or the like can be used in conjunction with the laser module 102. These optional components are fairly well known in the art and will not be discussed in detail herein.

Thus, the design of the laser module, any associated driver circuit, type of the connector used and connecting apparatus of the present invention provides a safe and efficient method permitting an operator to "hot-swap" a laser module and its electronics in and out of the laser projector without powering down the laser projector. The laser driver circuit and mounting design allows for the laser module and housing to be at ground potential when powered, i.e., the same potential as laser projector chassis ground.

Figure 8:
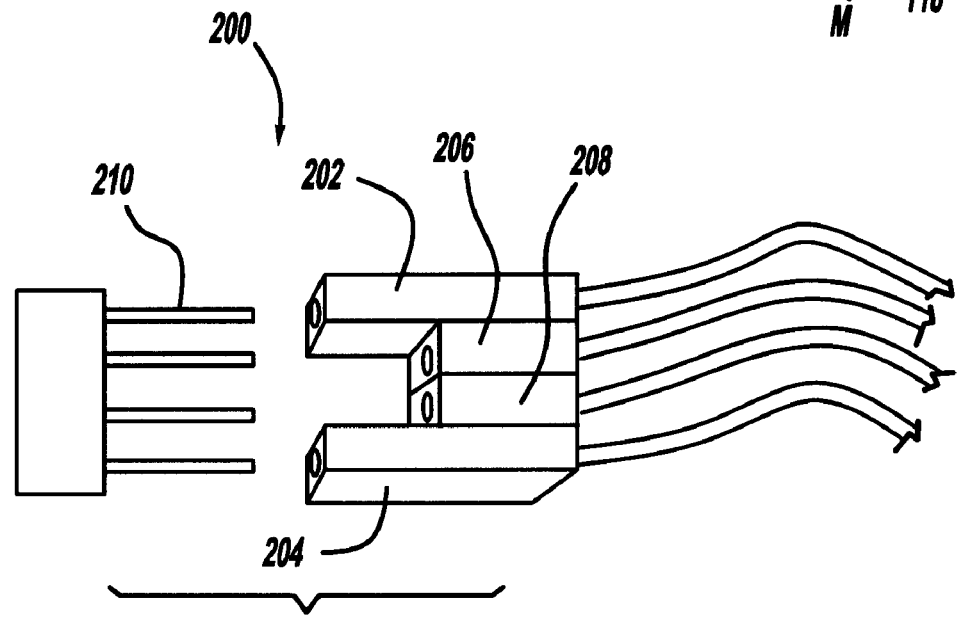
FIG. 8 illustrates a partial exploded view of an alternative connector system for a replaceable laser module, in accordance with a sixth aspect of the present invention.

In accordance with an alternative embodiment of the present invention, the connector used on the laser driver board is chosen to be a sequential type and the connecting scheme is such that it connects the electrical ground first, then power supply and control signal in second level, or in second and third level. The embodiment of the connector 200 shown in FIG. 8 can be an off-the-shelf product type generally known as "make-first/break-last" connectors having recessed pins or contacts designed to establish connection in the sequence described above with the ground contacts on longer pins first and break last. Laser module driving circuit has a simple soft-start circuit to provide contact de-bouncing and protect laser and electronics from damage and without having to power down the laser projector. As will be understood, however, other types of quick connect connectors may also be used provided the connector first connects the electrical ground first, followed by the power supply and control signal. FIG. 8 shows a four prong connector 200 including two projecting contacts 202, 204, respectively, to electrical ground or ground potential and two recessed prongs or contacts 206, 208, respectively, to the laser power source and control circuit, but the number of prongs or contacts will depend upon the application.

The method of replacing a laser module in a laser projector without powering down the laser projector of this invention thus includes removing the defective laser module from the laser projector, then connecting a new laser module in the laser projector by first connecting the electrical ground, then connecting the power supply and control signal to the respective connector members 210 of the laser projector. In one preferred embodiment, the laser projector includes a connector having projecting and recessed contacts, wherein the method of this invention includes connecting the electrical ground in the projecting contacts and then connecting the power supply and control signal in the recessed contacts.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A laser projector system, comprising:
    a green diode pumped microchip laser module projecting a green laser beam;
    an optical sensor receiving the laser beam;
    a power control circuit for the green diode pumped microchip laser module receiving a signal from the optical sensor relative to the power output of the laser beam; and
    control electronics receiving the signal from the optical sensor connected to the power control circuit;
    wherein the laser module is quickly replaceable with a substitute laser module external to the laser projector system without requiring alignment or adjustment of the laser projector system.

2. The invention according to claim 1, further comprising a beam sampling system, the beam sampling system comprising a beam splitter member and a beam compensator member positioned relative to the first beam splitter member.

3. The invention according to claim 2, wherein the beam splitter system is selectively adjusted to substantially compensate for relative reflectance of the laser beam.

4. The invention according to claim 1, wherein the control electronics are selectively operable to modulate the power output of the green diode pumped microchip laser module.

5. The invention according to claim 4, wherein the modulation of the power output of the green diode pumped microchip laser module is selectively operable to maintain a substantially constant power output from the green diode pumped microchip laser module.

6. The invention according to claim 1, wherein the laser projector includes a galvanometer having a driver rotating a mirror.

7. The invention according to claim 6, wherein the control electronics modulates the green diode pumped microchip laser module in proportion to the rotational speed of the mirror.

8. The invention according to claim 1, wherein the green diode pumped microchip laser module includes a laser diode aligned with a pumped crystal bonded to a doubler crystal generating a green laser beam.

9. The invention according to claim 1, wherein the laser module includes a connection system, wherein the connection system is a quick connect system that electrically connects the system as a byproduct of inserting the laser module.

10. The invention according to claim 1, wherein the laser module includes a housing and a laser system operable to project the laser beam, wherein the laser system is disposed in a bore formed in the housing, wherein a curable adhesive material is disposed between a surface of the bore and the laser system so as to secure the laser system in a predetermined orientation.

11. The invention according to claim 1, further comprising a magnet system operable to selectively hold the laser module against a surface regardless of orientation.

12. The invention according to claim 1, further comprising an enclosure for enclosing the laser module, wherein the enclosure includes a hatch member for permitting access to the laser module.

13. A laser projector system, comprising:
    a green diode pumped microchip laser module projecting a green laser beam;
    a beam sampling system, the beam sampling system comprising a beam splitter member and a beam compensator member positioned relative to the beam splitter member;
    wherein the beam splitter system is selectively adjusted to substantially compensate for relative reflectance of the laser beam;
    an optical sensor receiving the laser beam;
    a power control circuit for the green diode pumped microchip laser module receiving a signal from the optical sensor relative to the power output of the laser beam; and
    control electronics receiving the signal from the optical sensor connected to the power control circuit;
    wherein the laser module is quickly replaceable with a substitute laser module external to the laser projector system without requiring alignment or adjustment of the laser projector system.

14. The invention according to claim 13, wherein the control electronics are selectively operable to modulate the power output of the green diode pumped microchip laser module.

15. The invention according to claim 14, wherein the modulation of the power output of the green diode pumped microchip laser module is selectively operable to maintain a substantially constant power output from the green diode pumped microchip laser module.

16. The laser projector as defined in claim 13, wherein the laser projector includes a galvanometer having a driver rotating a mirror.

17. The laser projector as defined in claim 16, wherein the control electronics modulates the green diode pumped microchip laser module in proportion to the rotational speed of the mirror.

18. The laser projector as defined in claim 13, wherein the green diode pumped microchip laser module includes a laser diode aligned with a pumped crystal bonded to a doubler crystal generating a green laser beam.

19. The invention according to claim 13, wherein the laser module includes a connection system, wherein the connection system is a quick connect system that electrically connects the system as a byproduct of inserting the laser module.

20. The invention according to claim 13, wherein the laser module includes a housing and a laser system operable to project the laser beam, wherein the laser system is disposed in a bore formed in the housing, wherein a curable adhesive material is disposed between a surface of the bore and the laser system so as to secure the laser system in a predetermined orientation.

21. The invention according to claim 13, further comprising a magnet system operable to selectively hold the laser module against a surface regardless of orientation.

22. The invention according to claim 13, further comprising an enclosure for enclosing the laser module, wherein the enclosure includes a hatch member for permitting access to the laser module.

23. A laser projector system, comprising:
- a green diode pumped microchip laser module projecting a green laser beam;
- a beam sampling system, the beam sampling system comprising a beam splitter member and a beam compensator member positioned relative to the beam splitter member;
- wherein the beam splitter system is selectively adjusted to compensate for relative reflectance of the laser beam;
- an optical sensor receiving the laser beam;
- a power control circuit for the green diode pumped microchip laser module receiving a signal from the optical sensor relative to the power output of the laser beam; and
- control electronics receiving the signal from the optical sensor connected to the power control circuit;
- wherein the laser module is quickly replaceable with a substitute laser module external to the laser projector system without requiring alignment or adjustment of the laser projector system;
- wherein the control electronics are selectively operable to modulate the power output of the green diode pumped microchip laser module;
- wherein the modulation of the power output of the green diode pumped microchip laser module is selectively operable to maintain a substantially constant power output from the green diode pumped microchip laser module.

24. The laser projector as defined in claim 23, wherein the laser projector includes a galvanometer having a driver rotating a mirror.

25. The laser projector as defined in claim 24, wherein the control electronics modulates the green diode pumped microchip laser module in proportion to the rotational speed of the mirror.

26. The laser projector as defined in claim 23, wherein the green diode pumped microchip laser module includes a laser diode aligned with a pumped crystal bonded to a doubler crystal generating a green laser beam.

27. The invention according to claim 23, wherein the laser module includes a connection system, wherein the connection system is a quick connect system that electrically connects the system as a byproduct of inserting the laser module.

28. The invention according to claim 23, wherein the laser module includes a housing and a laser system operable to project the laser beam, wherein the laser system is disposed in a bore formed in the housing, wherein a curable adhesive material is disposed between a surface of the bore and the laser system so as to secure the laser system in a predetermined orientation.

29. The invention according to claim 23, further comprising a magnet system operable to selectively hold the laser module against a surface regardless of orientation.

30. The invention according to claim 23, further comprising an enclosure for enclosing the laser module, wherein the enclosure includes a hatch member for permitting access to the laser module.

* * * * *